US012766579B2

(12) United States Patent
Kwon

(10) Patent No.: US 12,766,579 B2
(45) Date of Patent: Oct. 20, 2026

(54) METHOD FOR MANUFACTURING BATTERY CASE OF ELECTRIC VEHICLE AND BATTERY CASE MANUFACTURED THEREBY

(71) Applicant: PUKYONG NATIONAL UNIVERSITY INDUSTRY-UNIVERSITY COOPERATION FOUNDATION, Busan (KR)

(72) Inventor: Hansang Kwon, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 245 days.

(21) Appl. No.: 18/620,467

(22) Filed: Mar. 28, 2024

(65) Prior Publication Data

US 2024/0238857 A1 Jul. 18, 2024

Related U.S. Application Data

(63) Continuation of application No. PCT/KR2021/014365, filed on Oct. 15, 2021.

(30) Foreign Application Priority Data

Oct. 5, 2021 (KR) ........................ 10-2021-0131559

(51) Int. Cl.
*B21C 33/00* (2006.01)
*B21C 23/00* (2006.01)
(Continued)

(52) U.S. Cl.
CPC .......... *B21C 33/004* (2013.01); *B21C 23/002* (2013.01); *B21C 23/01* (2013.01);
(Continued)

(58) Field of Classification Search
CPC ..... B21C 23/002; B21C 23/01; B21C 23/085; B21C 23/22; B21C 23/24; B21C 33/004
See application file for complete search history.

(56) References Cited

U.S. PATENT DOCUMENTS 3,096,577 A * 7/1963 Carlson ..................... B21C 1/00 228/231
3,184,945 A * 5/1965 Hornak .................. B21C 23/20 72/267
(Continued)

FOREIGN PATENT DOCUMENTS

JP 2005078894 A 3/2005
KR 10-2017-0102741 A 9/2017
(Continued)

OTHER PUBLICATIONS

CN 106001152A, Li et al. Oct. 2016.*
(Continued)

*Primary Examiner* — Edward T Tolan
(74) *Attorney, Agent, or Firm* — Dinsmore & Shohl LLP; Yongsok Choi, Esq.

(57) ABSTRACT

The present disclosure relates to a method for manufacturing a battery casing of an electric vehicle and a battery casing manufactured thereby. The method includes the steps of: (a) preparing an extrusion billet including a cylindrical core and a hollow cylindrical shell surrounding the outer circumferential surface of the cylindrical core; and (b) extruding the extrusion billet to manufacture an extruded member having a battery casing shape.

4 Claims, 3 Drawing Sheets

(51) Int. Cl.
*B21C 23/01* (2006.01)
*H01M 50/119* (2021.01)
*H01M 50/124* (2021.01)

(52) U.S. Cl.
CPC ....... *H01M 50/119* (2021.01); *H01M 50/124* (2021.01); *H01M 2220/20* (2013.01)

(56) References Cited

U.S. PATENT DOCUMENTS

| | | | | |
|---|---|---|---|---|
| 3,648,351 A * | 3/1972 | Kibler | B21C 23/186 138/143 | |
| 2023/0019810 A1* | 1/2023 | Kwon | C22C 26/00 | |

FOREIGN PATENT DOCUMENTS

| | | |
|---|---|---|
| KR | 10-2290087 B1 | 8/2021 |
| KR | 10-2298678 B1 | 9/2021 |

OTHER PUBLICATIONS

GB 1418654A, Asada et al. Dec. 1975.*
KR 101822073B1, Kwon et al. Jan. 2018.*
Translation KR 101822073B1, Kwon et al. Jan. 2018.*

* cited by examiner

METHOD FOR MANUFACTURING BATTERY CASE OF ELECTRIC VEHICLE AND BATTERY CASE MANUFACTURED THEREBY

CROSS-REFERENCE TO RELATED APPLICATIONS

This is a continuation application of International Application No. PCT/KR2021/014365 filed on Oct. 15, 2021, which claims priority to Korean Application No. 10-2021-0131559 filed on Oct. 5, 2021, the entire contents of which are herein incorporated by reference.

TECHNICAL FIELD

The present disclosure relates to a method of manufacturing a battery casing for an electric vehicle and a battery casing manufactured thereby.

BACKGROUND ART

The transition from internal combustion engine vehicles to electric vehicles is an imperative for automakers around the world.

A battery, which is one of the core components of an electric vehicle, provides driving power to an electric motor by repeatedly charging and discharging during operation. The battery continuously increases in temperature due to the phenomenon of heat generation during charging and discharging. When the temperature of the battery increases excessively, the temperature increase can cause performance degradation and shorten the life of the battery, and in severe cases, it can cause a battery fire.

Therefore, the casing material of the battery needs to have good properties to ensure the safe and efficient use of electric vehicles.

SUMMARY

Technical Problem

The technical problem to be solved by the present disclosure is to provide a method for manufacturing an electric vehicle battery casing having excellent physical properties through a simple manufacturing process suitable for mass production and to provide an electric vehicle battery casing manufactured thereby.

Technical Solution

To solve the technical problem, the present disclosure proposes a method of manufacturing an electrical vehicle battery casing, the method including: (a) preparing an extrusion billet including a cylindrical core and a hollow cylindrical shell surrounding the outer circumferential surface of the cylindrical core; and (b) extruding the extrusion billet to produce an extruded member having a battery casing shape.

Additionally, in the method, the cylindrical core may be made of copper (Cu), and the hollow cylindrical shell may be made of aluminum (Al).

Additionally, in the method, the cylindrical core may be made of aluminum (Al), and the hollow cylindrical shell may be made of copper (Cu).

Additionally, in the method, the cylindrical core may include aluminum and carbon nanotubes, and the hollow cylindrical shell may be made of aluminum (Al).

Additionally, in the method, the cylindrical core may include: a core layer made of aluminum (Al); and a sheath layer including aluminum and carbon nanotubes and surrounding the outer circumferential surface of the core layer.

Additionally, in the step (b) of the method, the billet may be extruded by an indirect extrusion process, a direct extrusion process, a hydrostatic extrusion process, or an impact extrusion process.

In another aspect of the present disclosure, there is provided an electric vehicle battery casing manufactured by the method.

Advantageous Effects

With the use of the manufacturing method according to the present disclosure, it is possible to manufacture an electric vehicle battery casing having excellent physical properties by extruding a billet composed of two metals, i.e., aluminum and copper or dissimilar materials such as aluminum and carbon nanotubes through a simple manufacturing process suitable for mass production.

DETAILED DESCRIPTION

Figure 1:
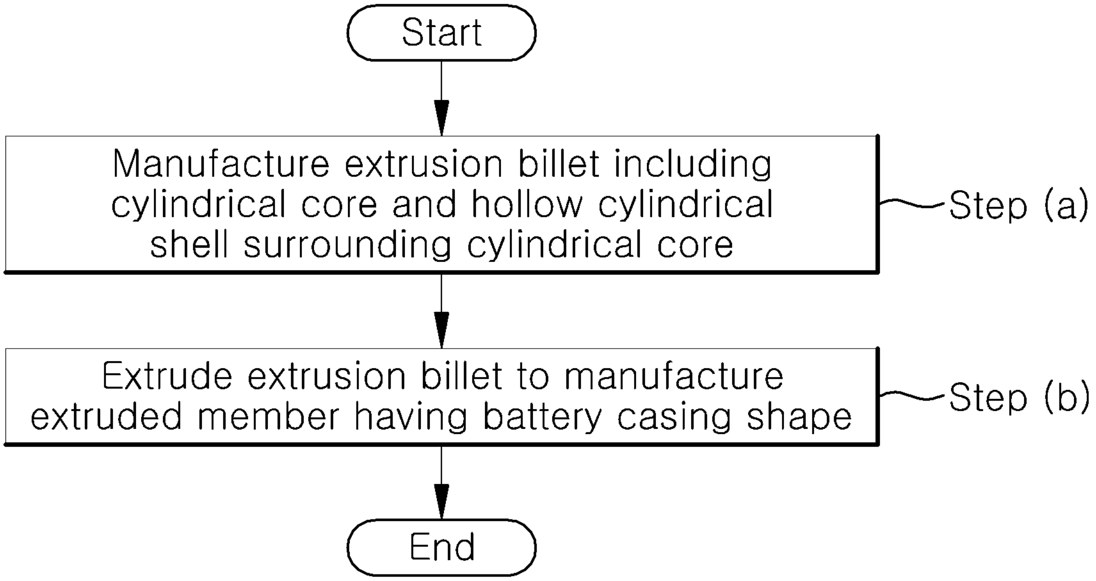
FIG. 1 is a process flowchart illustrating a method of manufacturing a battery casing for an electric vehicle, according to the present disclosure.

In describing the present invention, well-known functions or constructions will not be described in detail when it is determined that they may obscure the gist of the present disclosure.

Since embodiments in accordance with the concept of the present disclosure can undergo various changes and have various forms, only some specific embodiments are illustrated in the drawings and described in detail in the present specification. While specific embodiments of the present disclosure are described herein below, they are only for illustrative purposes and should not be construed as limiting to the present disclosure. So, the present disclosure should be construed to cover not only the specific embodiments but also cover all modifications, equivalents, and substitutions that fall within the concept and technical spirit of the present disclosure.

The terminology used herein is for the purpose of describing particular embodiments only and is not intended to limit the scope of the present disclosure. As used herein, the singular forms “a”, “an”, and “the” are intended to include the plural forms as well unless the context clearly indicates otherwise. It will be further understood that the terms “comprise”, “includes”, or “has” when used in the present specification specify the presence of stated features, regions, integers, steps, operations, elements and/or components, but do not preclude the presence or addition of one or more other features, regions, integers, steps, operations, elements, components and/or combinations thereof.

Hereinafter, the present disclosure will be described in detail.

The present disclosure proposes a method of manufacturing an electrical vehicle battery casing, the method including: (a) preparing an extrusion billet including a cylindrical core and a hollow cylindrical shell surrounding the outer circumferential surface of the cylindrical core; and (b) extruding the extrusion billet to produce an extruded member having a battery casing shape (see FIG. 1).

Figure 2:
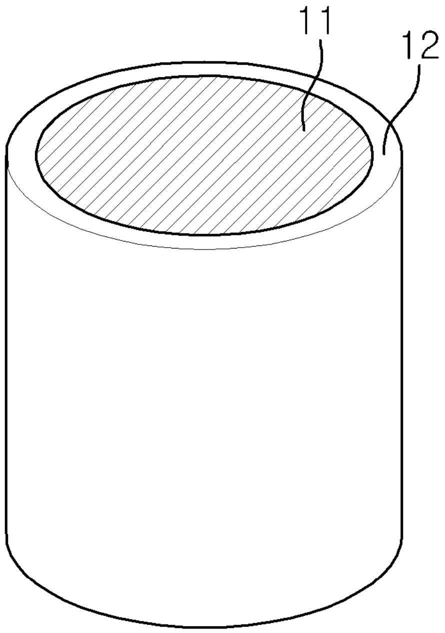
FIG. 2 is a schematic diagram illustrating an exemplary form of an extrusion billet used for the production of a battery casing for an electric vehicle, according to the present disclosure.

In step (a) above, as illustrated in FIG. 2, the extrusion billet composed of a cylindrical core 11 and a hollow cylindrical shell 12 surrounding the core 11 is prepared.

In step (a), the cylindrical core and hollow cylindrical shell may be made of different metals. For example, the cylindrical core may be made of copper (Cu), and the hollow cylindrical shell may be made of aluminum (Al). Alternatively, the cylindrical core may be made of aluminum (Al), and the hollow cylindrical shell may be made of copper (Cu).

Here, the thickness of the hollow cylindrical shell may be in a range of from 0.5 mm to 150 mm in the case where the extrusion billet is a 6-inch billet, but the thickness is not necessarily limited to the range. The thickness of the hollow cylindrical shell may vary depending on the size of the billet.

In addition, the hollow cylindrical shell may be in the shape of a can with one end closed or in the shape of a hollow cylinder with both ends open. The hollow cylindrical shell may be manufactured by melting a metal base and injecting the molten metal into a mold to produce a hollow cylinder or by machining the metal base.

As the method for manufacturing the billet composed of a cylindrical core and a hollow cylindrical shell which are made of two different metals as described above in connection with step (a), any one of the methods described below may be used. For example, the billet composed of a solid cylindrical core and a hollow cylindrical shell surrounding the core may be prepared by press-fitting the solid cylindrical core into the hollow cylindrical shell. Alternatively, the billet may be prepared by filling the hollow cylindrical shell with a metal powder, which is the material for the formation of the solid cylindrical core, and sintering the metal powder through a rapid sintering process such as spark plasma sintering.

In addition, in step (a), the extrusion billet containing dissimilar materials, such as aluminum and carbon nanotubes, may be prepared.

The extrusion billet including aluminum and carbon nanotubes may include a cylindrical core made of aluminum and carbon nanotubes and a hollow cylindrical shell made of aluminum.

In this case, a composite powder of aluminum powder and carbon nanotubes, which is used to obtain the cylindrical core made of aluminum and carbon nanotubes, may be prepared before the preparation of the billet.

The aluminum/carbon nanotube composite powder can be prepared by ball-milling aluminum powder and carbon nanotube powder. Since the billet including the aluminum/carbon nanotube composite powder contains carbon nanotubes, when the composite powder is used to prepare a composite material, such as a cladding material through plastic working such as extrusion, rolling, forging, etc., the composite material may have high thermal conductivity, high strength, and lightweight characteristics.

Micro-sized aluminum particles are difficult to disperse due to a large size difference from the nano-sized carbon nanotubes, and the carbon nanotubes easily cluster due to strong Van der Waals force. Therefore, a dispersing agent is added to uniformly disperse the carbon nanotubes in the aluminum powder.

As the dispersing agent, nano-sized ceramic particles selected from the group consisting of SiC, $SiO_2$, $Al_2O_3$, $TiO_2$, $Fe_3O_4$, MgO, $ZrO_2$, and various mixtures of these may be used.

The nano-sized ceramic particles function to uniformly disperse the carbon nanotubes among the aluminum particles. The nano-sized silicon carbide (SiC) particles have high tensile strength, high sharpness, constant electrical conductivity, constant thermal conductivity, high hardness, and high resistance to chemicals and thermal shock. Since the nano-sized SiC particles are highly stable at high temperatures and under chemicals, they are widely used as a material for an abrasive or a fireproofing material. In addition, the nano-sized SiC particles present on the surface of the aluminum particles function to prevent direct contact between the carbon nanotubes and the aluminum particles, thereby inhibiting the formation of undesirable aluminum carbide which may be formed through a reaction between the carbon nanotubes and the aluminum particles.

In addition, the composite powder may include 100 parts by volume of the aluminum powder and 0.01 to 10 parts by volume of the carbon nanotubes.

When the content of the carbon nanotubes is less than 0.01 part by volume per 100 parts by volume of the aluminum powder, since the strength of the composite material is similar to that of aluminum, the composite material cannot serve as a reinforcing material. Conversely, when the content of the carbon nanotubes exceeds 10 parts by volume, there is a disadvantage in that an elongation decreases although the strength of the composite material is higher than that of aluminum. When the content of the carbon nanotubes is extremely high, since the carbon nanotubes are difficult to disperse, the prepared composite material may have poor mechanical and physical properties.

In the case where a dispersing agent is added to the composite powder, the dispersing agent may be added in an amount of 0.1 to 10 parts by volume with respect to 100 parts by volume of the aluminum powder.

When the content of the dispersing agent is less than 0.1 part by volume with respect to 100 parts by volume of the aluminum powder, the effect of dispersing the carbon nanotubes is insignificant. Conversely, when the content exceeds 10 parts by volume, the dispersing agent rather causes the carbon nanotubes to cluster, thereby hindering the dispersion of the carbon nanotubes.

The ball milling is performed in an air or inert gas ambient (for example, nitrogen or argon ambient) at a low speed of 150 to 300 rpm or a high speed of 300 or more rpm for a duration of 12 to 48 hours, using a ball mill. For example, a horizontal ball mill or a planetary ball mill is used for the ball milling.

The ball milling begins by charging 100 to 1500 parts by volume of stainless steel balls (10-mm balls and 20-mm balls in a mixing ratio of 1:1) per 100 parts by volume of the composite powder, into a stainless steel container.

To reduce the coefficient of friction, any one organic solvent selected from the group consisting of heptane, hexane, and alcohol is used as a process control agent. In this case, the process control agent is added in an amount of 10 to 50 parts by volume per 100 parts by volume of the composite powder. After the completion of the ball milling, the container is opened so that the organic solvent can volatilize and escape through a hood. Therefore, at the time of collecting the powder mixture, only the aluminum powder and the carbon nanotubes remain in the powder mixture.

The nano-zed ceramic particles serving as the dispersing agent also play the same role as nano-sized milling balls due to the rotational force generated during the ball milling, thereby physically separating the clustered nanotubes from each other and improving the fluidity of the carbon nanotubes. Therefore, the carbon nanotubes can uniformly disperse on the surface of the aluminum particles.

Next, a multilayer billet is made from the obtained aluminum/carbon nanotube composite powder.

Figure 3:
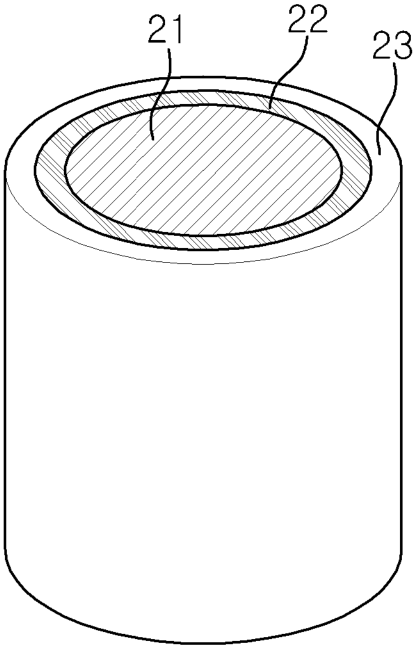
FIG. 3 is a schematic diagram illustrating another exemplary form of the extrusion billet used for the production of a battery casing for an electric vehicle, according to the present disclosure.

As illustrated in FIG. 2, the multilayer billet manufactured in this step may include only a cylindrical core 11 containing aluminum and carbon nanotubes and a hollow cylindrical shell 12 made of aluminum and configured to surround the cylindrical core 11. Alternatively, as illustrated in FIG. 3, the multilayer billet may include: a cylindrical core composed of a core layer 21 containing aluminum or the aluminum/carbon nanotube composite powder and a sheath layer 22 surrounding the core layer 21 and containing the aluminum/carbon nanotube composite powder; and a hollow cylindrical shell 23 made of aluminum and surrounding the cylindrical core.

When the core layer is made of the aluminum/carbon nanotube composite powder, the composite powder contained in the core layer and the composite powder contained in the sheath layer preferably differ in composition, so that the volume fraction of carbon nanotubes to aluminum powder is different between the composite power contained in the core layer and the composite power contained in the sheath layer.

For example, the sheath layer may contain 0.09 to 10 parts by volume of carbon nanotubes per 100 parts by volume of aluminum, and the core layer may container 0 to 0.08 parts by volume of carbon nanotubes per 100 parts by volume of the aluminum powder.

Of the total volume of the billet, the sheath layer 22 of the extrusion billet accounts for 0.01% to 10% by volume, the core layer 21 of the extrusion billet accounts for 0.01% to 10% by volume, and the hollow cylindrical shell 23 accounts for the volume fraction.

Since the extrusion billet includes the core layer 21 or sheath layer 22 including the aluminum/carbon nanotube composite powder, the extrusion billet may be compressed at a high pressure of 10 to 100 MPa before being sealed. By compressing the billet in this way, it is possible to subsequently extrude the billet using an extrusion die. When the pressure to compress the composite powder is less than 10 MPa, pores are likely to occur in the produced composite powder having undergone plastic working, and the composite powder is likely to flow down. When the pressure exceeds 100 MPa, the sheath layer is likely to expand due to the high pressure.

The method may further include sintering the billet to provide the billet to a plastic working process, such as extrusion because the billet includes the core layer and/or sheath layer including the aluminum/carbon nanotube composite powder.

A spark plasma sintering apparatus or a hot press sintering apparatus may be used for the sintering. However, any type of sintering apparatus can be used if the same objective can be achieved. However, when it is necessary to precisely sinter the billet in a short time, it is preferable to use discharge plasma sintering. In this case, the discharge plasma sintering is performed at a temperature of in the range of 280° C. to 600° C. at a pressure in the range of 30 to 100 MP for a duration of 1 second to 30 minutes.

Next, in step (b) above, the multilayer billet is extruded to produce a battery casing-shaped extruded member.

The extrusion process used in step (b) is not particularly limited, and for example, the extrusion process may be performed by an indirect extrusion process, a direct extrusion process, a hydrostatic extrusion process, or an impact extrusion process.

MODE FOR INVENTION

Hereinafter, embodiments of the present disclosure will be described in more detail by way of examples.

Examples disclosed in the present disclosure can be modified into various other forms, and the scope of the present disclosure is not construed as being limited to the examples described below. Examples are provided to more fully convey the concept of the present disclosure to the ordinarily skilled in the art.

EXAMPLE

In this example, carbon nanotubes having a purity of 99.5% and a diameter and length of 10 nm or less and 30 μm or less, respectively (a product of OCSiAl, Luxembourg) and an aluminum powder having an average particle diameter of 45 μm and a purity of 99.8% (MetalPlayer, Korea) were used to prepare an extrusion billet in which a core layer in the shape of a column is located in the center of an aluminum can corresponding to a hollow cylindrical shell, and a sheath layer including an aluminum/carbon nanotube composite powder is located between the aluminum can and the core layer.

The sheath layer included an aluminum/carbon nanotube composite powder containing 0.1 part by volume of carbon nanotubes with respect to 100 parts by volume of aluminum powder. The aluminum can was made of aluminum 6063, and the core layer was made of aluminum alloy 3003.

The sheath layer was manufactured in a manner described below. 100 parts by volume of the aluminum powder and 0.1 parts by volume of the carbon nanotubes were introduced into a stainless steel container to account for 30% of the total volume of the stainless steel. Stainless steel milling balls (a mixture of balls having a diameter of 20 mm and balls having a diameter of 10 mm) were introduced into the container to account for 30% of the total volume of the container, and 50 ml of heptane was added to the mixture in the stainless steel container. The mixture was ball-milled at a low speed of 250 rpm for 24 hours using a horizontal ball mill. Next, the container was opened to allow the heptane to completely volatilize and escape through a hood, and the remaining aluminum/carbon nanotube composite powder was collected.

The aluminum/carbon nanotube composite powder thus prepared was charged into a gap 2.5 t between the core layer and the aluminum can and was compacted at a pressure of 100 MPa to prepare the extrusion billet.

The extrusion billet thus prepared in were extruded directly using a direct extruder under the conditions of an extrusion ratio of 100, an extrusion rate of 5 mm/s, an extrusion pressure of 200 kg/cm$^2$, and a billet temperature of 460° C. to produce an extruded member with a battery casing shape.

While exemplary embodiments of the present disclosure have been described with reference to the accompanying drawings, those skilled in the art will appreciate that the present disclosure can be implemented in other different forms without departing from the technical spirit or essential characteristics of the exemplary embodiments. Therefore, it can be understood that the exemplary embodiments described above are only for illustrative purposes and are not restrictive in all aspects.

INDUSTRIAL APPLICABILITY

According to the present disclosure, an electric vehicle battery casing with excellent physical properties can be manufactured using a simple manufacturing process suitable for mass production.

The invention claimed is:

1. A method of manufacturing a battery casing for an electric vehicle, the method comprising:

(a) preparing an extrusion billet comprising a cylindrical core and a hollow cylindrical shell surrounding an outer circumferential surface of the cylindrical core, wherein the cylindrical core comprises:

a core layer made of aluminum (Al); and a sheath layer comprising an aluminum and carbon nanotube composite powder and surrounding an outer circumferential surface of the core layer, wherein the aluminum and carbon nanotube composite powder is prepared by ball-milling aluminum powder and carbon nanotube powder in the presence of a nano-sized ceramic dispersing agent comprising silicon carbide (SiC), and wherein the hollow cylindrical shell is made of aluminum (Al); and (b) extruding the extrusion billet to produce an extruded member having a battery casing shape.

2. The method of claim 1, wherein in the step (b) of extruding the extrusion billet, the billet is extruded by an indirect extrusion process, a direct extrusion process, a hydrostatic extrusion process, or an impact extrusion process.

3. A battery casing for an electric vehicle, the battery casing being manufactured by the method of claim 1.

4. A battery casing for an electric vehicle, the battery casing being manufactured by the method of claim 2.

* * * * *